United States Patent Office 3,575,902
Patented Apr. 20, 1971

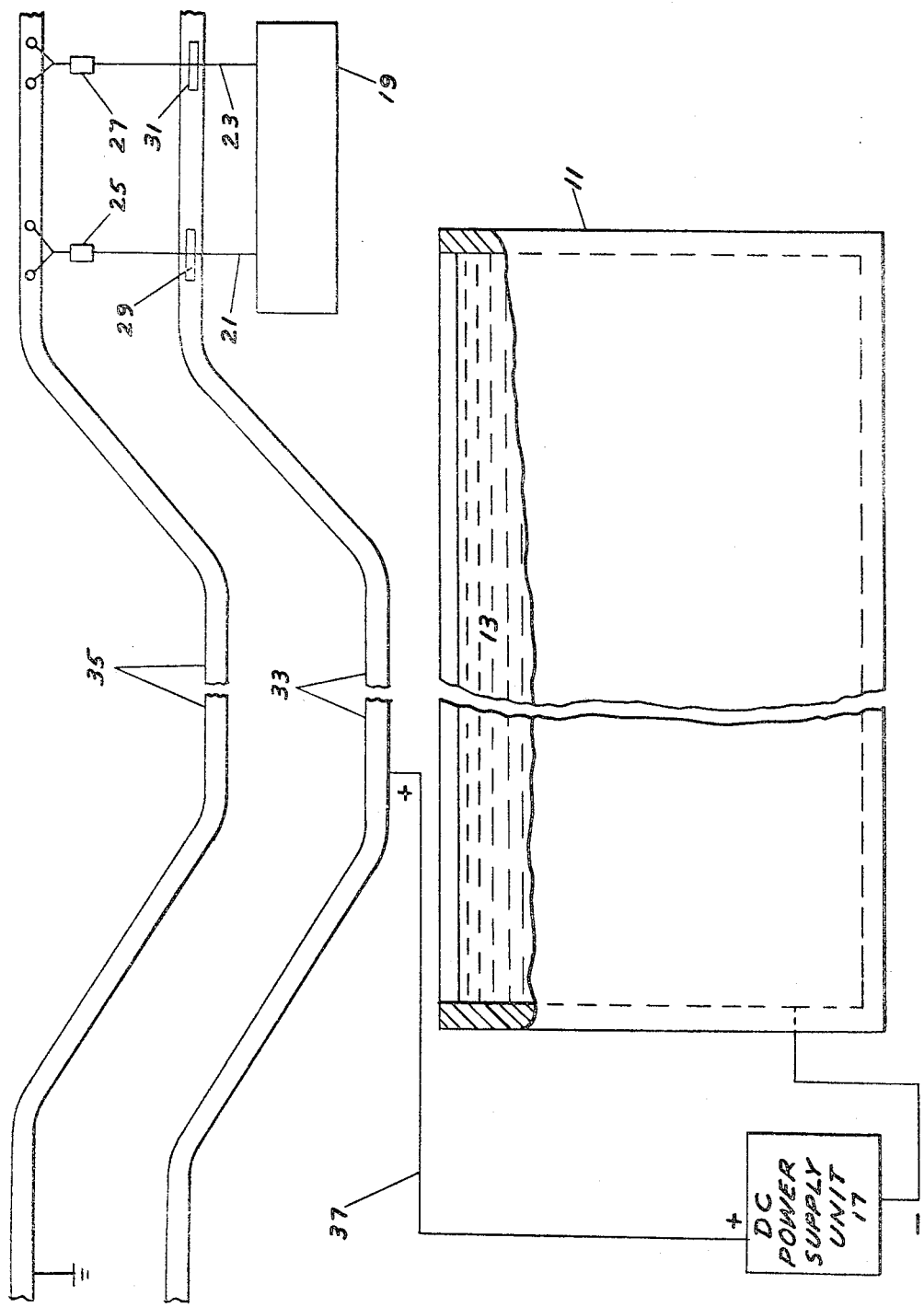

3,575,902
ELECTRODEPOSITION OF ACID RESIN I
Ivan H. Tsou, Pontiac, Mich., assignor to Ford Motor Company, Dearborn, Mich.
Continuation-in-part of application Ser. No. 363,813, Apr. 30, 1964. This application Apr. 24, 1968, Ser. No. 734,827
Int. Cl. C08g 30/00
U.S. Cl. 260—23                                                    2 Claims

ABSTRACT OF THE DISCLOSURE

A paint bath composition for electrodeposition of paint upon an anode comprising an aqueous dispersion of particulate pigment, a water soluble base, and a polycarboxylic acid resin having olefinically unsaturated side chains and formed by first reacting a polyhydroxylated polymer with an olefinically unsaturated, acyclic, carboxylic acid of about 18 carbon atoms, reacting the resulting resin with trimellitic anhydride and subsequently reacting the resultant acid resin with a polyolefin glycol having a molecular weight in excess of about 200.

This application is a continuation-in-part of application Ser. No. 363,813 filed Apr. 30, 1964, and now abandoned.

This application relates to an improved paint binder resin for use in anodic deposition of paint from an aqueous coating bath. Electrically induced deposition of paint having a polycarboxylic acid resin binder from an aqueous coating bath provides an effective means for placing a coating of uniform depth upon all exposed areas of metal articles, including those having recessed or irregularly shaped surfaces. This process is exemplified in the art by Gilchrist, U.S. Patent 3,230,162.

Large scale coating operations require that the coating materials employed in such process provide a physically and chemically stable coating bath, i.e. a bath that will permit continuous operation of the coating system through continuous or intermittent addition of replacement feed, provide a uniform, blemish-free film that will retain such uniformity upon heat induced curing, and, when applied to articles subjected to outdoor exposure, a high level of corrosion protection after conventional treatment to effect curing.

Preferably, the coating material for use in this process is one that requires a minimum of electrical energy to provide a film of acceptable thickness in a minimum time upon the most inaccessible and/or electrically shielded surfaces of the workpiece. The degree to which a given coating material possesses this characteristic in relation to other coating formulations under like conditions is termed the "throw" or "throwing power" of the formulation. In many applications, it is also necessary that the coating provided be one that is compatible with conventional sanding procedures and with the application of an overcoating which may be of the same or of different composition. In others, the coating thus applied may be the sole paint application made upon the object.

This invention is concerned with novel and superior coating materials for use in the aforedescribed painting process and to a coating bath containing the same. This bath will ordinarily include a particulate pigment, a water soluble base, preferably a water soluble amine although such materials as ammonium hydroxide, potassium hydroxide, etc., may be used, and a polycarboxylic acid binder resin.

At least the predominant fraction of the film-forming binder resin of this coating bath is a polycarboxylic acid resin having an acid number above about 20, preferably about 35 to about 75, although resins with higher acid numbers can be used. This resin is prepared by reacting a linear base polymer having a plurality of hydroxyl groups which are displaced from the principal carbon to carbon chain by not more than 1 carbon atom with an acyclic, olefinically unsaturated, carboxylic acid of at least about 6 carbon atoms in an amount sufficient to effect reaction of an partial but incomplete amount of said hydroxyl groups, reacting the resultant resin with trimellitic anhydride, the mole ratio of said anhydride to said olefinically unsaturated, carboxylic acid in the resultant polycarboxylic acid resin being in the range of about 1:1 to about 1:3, and subsequently reacting the resultant acid resin with a polyolefin glycol having a molecular weight of at least 200. The base polymer is free of other side chain hydroxyl groups.

The linear base polymer consists essentially of the elements of carbon, hydrogen and oxygen and has a plurality of hydroxyl groups displaced from the principal carbon to carbon chain by 0–1 carbon atoms. Advantageously, the base polymer has about 2 to about 10, preferably an average of about 3 to about 7, free or dissociable hydroxyl groups per molecule.

The olefinically unsaturated $C_{18}$ acids existing in or derived from products of nature are plentiful and suitable for this purpose, i.e. fatty acids derived from linseed oil, tall oil, hempseed oil, walnut seed oil, perilla oil, soya bean oil, castor oil, sardine oil, menhaden oil, etc. The quantity of such acids reacted with the hydroxyl bearing polymer is limited to an amount that leaves a desired amount of hydroxyl groups on the base polymer unreacted for use in the second reaction step.

The resultant resin is then reacted with trimellitic anhydride, the 1,2 anhydride of 1,2,4-benzene tricarboxylic acid. Advantageously, the anhydride and the resin are admixed for reaction in relative concentrations that will provide a reaction product containing an average of at least one and preferably at least two molecules of the anhydride per molecule of resin. It will be understood by those skilled in the art that the polycarboxylic acid resin may also have dissociable monocarboxylic acid groups in its molecular structure as for instance by reacting some of the hydroxyl groups with a carboxyl of a suitable dicarboxylic acid such as adipic acid, but in the resin of this invention, the major proportion of the resin's acidity is provided by the dicarboxylic acid groups provided by reaction of the trimellitic anhydride with the hydroxyl bearing base resin.

The resultant acid resin is then reacted with polyethylene glycol or polypropylene glycol having a molecular weight of at least about 200. Polyolefin glycols having molecular weights up to about 2000 are suitable for this purpose.

The first reaction step is advantageously carried out at temperatures of about 400° to 450° F. or slightly higher. The reaction of the anhydride with remaining hydroxyl groups on the base polymer and reaction of the polyolefin glycol with the acid resin are both advantageously carried out at a temperature in the range of about 320° to 350° F. or slightly higher.

The amounts of olefinically unsaturated fatty acids, the amount of trimellitic anhydride, and the amount of polyolefin glycol employed in the aforedescribed reactions in relation to the quantity of the base polymer and in relation to each other to provide an acid number in the aforedescribed range.

Electrically induced deposition from an aqueous bath using coating materials of this invention is characterized by the high throwing power of these formulations. The coatings obtained by using these resins are durable, exhibit good flow-out characteristics, are compatible with conventional baking techniques, and afford the article coated with a high level of corrosion resistance, as measured by conventional salt spray testing. The polyolefin glycol modified resins offer good bath stability and are easily dispersed.

The invention will be more fully understood from the following illustrative examples:

EXAMPLE I

An electrocoating paint was prepared in the following manner:

Step (1)—1600 grams of a resin comprising a copolymer of styrene and allyl alcohol was admixed with 702 grams of linseed fatty acids and 1000 cc. xylene were charged to a reaction vessel and heated to 400° F. for one and one-half hours and then heated at 450° F. for four hours during which 53 cc. of water were removed and a polyester resin was formed.

The above referred to copolymer was further characterized as having an acid number of less than 0.5, a hydroxyl content of about 5.4—6.0 percent, a specific viscosity of 1,083 and a molecular weight of about 1600.

(2)—The reaction mixture of Step 1 was cooled to 330° F.

(3)—To the reaction product of Step 1 were added 192 grams trimellitic anhydride which lowered the temperature momentarily. The temperature was returned to 330° F. and retained there until the reaction mixture became clear.

(4)—To the clear reaction mixture of Step 3 were added 200 grams of 200 molecular weight polyethylene glycol. These ingredients were heated at 330° F. until an acid number of about 36.5 was reached, cooled, and 293 grams MEK were added.

(5)—The reaction mixture of Step 4 was ground with 333 grams red iron oxide to 6 Hegman and 189 grams of triisopropanolamine were added.

(6)—An emulsion was formed by admixing the material prepared in Step 5 with 8400 grams deionized water and agitating the same.

An electrocoating bath having a pH of 7.0 and containing 3.4 weight percent paint solids was prepared by diluting the abovedescribed emulsion with deionized water. Electrically induced deposition of the emulsified paint was carried on within a steel coating tank which was grounded and served as the cathode of the electrodeposition cell. Steel panels immersed in the bath were electrically charged and served as anodes of the cell. Coating was carried out at 100° F. at a potential of 450 volts. A uniform deposit of about 1.0 mil in thickness was obtained and the workpieces were removed from the bath. The coated panels were subsequently baked for 15 minutes at 380° F. The panels were then subjected to salt spray in accordance with A.S.T.M. test procedure #B117 and satisfactorily withstood 250 hours exposure. Other panels were coated at 250, 300 and 350 volts respectively.

In order to test the throwing power of the formulation, a triple leaf coating test was carried out. This test was carried out at 370 volts using a device formed by riveting together three rectangular mild steel sheets with a single rivet. The steel sheets each measured 3" x 8" and were fitted together in a manner so that, from a side view, the central rectangle was protected by two leaves diverging about 0.25" maximum from the riveted base. The amount of area coated on the center leaf is a measure of the "throw" of the formulation under the conditions employed. With this formulation, 75 percent of the central leaf was coated to a depth of approximately 1 mil within 1 minute after application of such voltage denoting high throwing power.

EXAMPLE II

Electrocoating paints are prepared as in Example I except that polypropylene glycol is employed as the polyolefin glycol.

EXAMPLE III

Electrocoating paints are prepared as in Example I except that the polyolefin glycols having an average molecular weight of about 400, 600, and 1200, respectively, were employed in lieu of the polyolefin glycols used in the preceding examples.

EXAMPLE IV

The procedure of Example I is repeated except that for the copolymer of styrene and allyl alcohol, there is substituted a partially hydrolyzed polyvinyl acetate which has been hydrolyzed under conditions to provide an average of about 5 to 7 hydroxyl groups per molecule.

It will be understood by those skilled in the art that modification can be made in the details of the foregoing examples without departing from the spirit and scope of the invention as set forth in the appended claims.

What I claim is:

1. In a bath of an electrodeposition cell consisting essentially of an aqueous dispersion of a water soluble base, particulate pigment, and a polycarboxylic acid resin having acid number above 20, the improvement wherein said polycarboxylic acid resin is formed by
   (1) reacting (a) an acrylic, olefinically unsaturated monocarboxylic acid of about 18 carbon atoms with (b) at least a portion of the hydroxyl groups of a linear base polymer consisting essentially of carbon, hydrogen and oxygen and having 2 to 10 hydroxyl groups per molecule which are displaced from its principal carbon to carbon chain by not more than 1 carbon atom,
   (2) reacting the resultant resin with trimellitic anhydride to form acid resin A, and
   (3) reacting acid resin A with a polyolefin glycol having molecular weight in excess of 200 to form said polycarboxylic acid resin, in such proportions that the mole ratio of said anhydride to said olefinically unsaturated, monocarboxylic acid in said polycarboxylic acid resin being in the range of about 1:1 to about 1:3 and the mole ratio of said polyethylene glycol to said acid resin being in the range of about 0.25 to about 3.5:1.

2. A bath of an electrodeposition cell in accordance with claim 1 wherein said linear base polymer consisting essentially of carbon, hydrogen and oxygen and having 2 to 10 hydroxyl groups per molecule which are displaced from its principal carbon to carbon chain by not more than 1 carbon atom is a copolymer of styrene and allyl alcohol and said polyolefin glycol has molecular weight in the range of 200 to 2,000.

References Cited

UNITED STATES PATENTS

| | | | |
|---|---|---|---|
| 3,293,201 | 12/1966 | Shahade et al. | 260—18X |
| 2,634,245 | 4/1953 | Arndt | 260—22 |
| 2,462,618 | 2/1949 | Eilerman | 260—22 |

DONALD E. CZAJA, Primary Examiner

C. W. IVY, Assistant Examiner

U.S. Cl. X.R.

204—181; 260—18, 22, 29.2